(12) United States Patent  (10) Patent No.: US 8,830,852 B2
Kikkawa et al.  (45) Date of Patent: Sep. 9, 2014

(54) COMMUNICATION DEVICE, COMMUNICATION SYSTEM, PROGRAM, AND COMMUNICATION METHOD

(75) Inventors: Norifumi Kikkawa, Tokyo (JP); Atsushi Onoe, Kanagawa (JP)

(73) Assignee: Sony Corporation, Tokyo (JP)

( * ) Notice: Subject to any disclaimer, the term of this patent is extended or adjusted under 35 U.S.C. 154(b) by 366 days.

(21) Appl. No.: 13/275,887

(22) Filed: Oct. 18, 2011

(65) Prior Publication Data
US 2012/0106376 A1 May 3, 2012

(30) Foreign Application Priority Data

Oct. 28, 2010 (JP) ................ P2010-242137

(51) Int. Cl.
*H04L 12/26* (2006.01)
*H04L 12/56* (2006.01)
(52) U.S. Cl.
CPC .............. *H04L 47/193* (2013.01); *H04L 47/25* (2013.01); *H04L 47/27* (2013.01)
USPC ............. 370/252; 370/389; 370/235
(58) Field of Classification Search
USPC ................................. 370/252, 389
See application file for complete search history.

(56) References Cited

U.S. PATENT DOCUMENTS

2010/0232427 A1* 9/2010 Matsushita et al. ........... 370/389

FOREIGN PATENT DOCUMENTS

JP  2006-5833  1/2006
JP  2006-279730  10/2006

* cited by examiner

*Primary Examiner* — Dang Ton
*Assistant Examiner* — Pamit Kaur
(74) *Attorney, Agent, or Firm* — Sony Corporation

(57) ABSTRACT

A communication device includes a communication unit that receives a reception window size from a reception side communication device and transmits a packet of a transmission amount corresponding to a transmission window size to the reception side communication device; and a control unit that determines whether a channel with respect to the reception side communication device is in a broad band and high delay circumstance, changes a first state where the transmission window size is a first window size which is not larger than the reception window size to a second state wherein the transmission window size is a second window size which is larger than the reception window size when the channel is determined as the broad band and high delay circumstance, and transmits the packet of the transmission amount larger than the reception window size in the second state.

12 Claims, 15 Drawing Sheets

COMMUNICATION DEVICE, COMMUNICATION SYSTEM, PROGRAM, AND COMMUNICATION METHOD

BACKGROUND

The present disclosure relates to a communication device which communicates with the other communication devices by a communication method such as TCP (Transmission Control Protocol).

Currently, TCP is widely used in the internet, intranets, and the like. In the TCP, when a data reception side communication device receives a packet from a data transmission side communication device, the reception side communication device transmits an acknowledgement (ack) back to the transmission side communication device. Accordingly, in the TCP, it is possible to realize communication with high reliability.

In the TCP, a slide window manner is employed; the transmission side communication device sequentially transmits the packet to the reception side transmission device to slide a window when the acknowledgement (ack) arrives.

In the TCP, generally, a flow control and a congestion control are performed. In the flow control, the reception side communication device reports the latest window size to the transmission side communication device. The transmission side communication device transmits a packet of a transmission amount corresponding to the reported reception window size. Accordingly, it is possible to prevent the packet from overflowing from a reception buffer of the reception side communication device.

Meanwhile, in the congestion control, the transmission side communication device controls a congestion window size according to a slow start algorithm and a congestion avoidance algorithm to avoid the congestion of the network. In the slow start algorithm, the congestion window size is set to 1 MSS (Maximum Segment Size) for the first time, and the congestion window size gradually increases. In the congestion avoidance algorithm, a process of detecting the congestion from loss of the packet or change of RTT (Round Trip Time) and adjusting the congestion window size is performed. When the packet is transmitted from the transmission side communication device, the packet of the transmission amount corresponding to the smaller sized window of the congestion window size and the reception window is transmitted.

A technique related to the TCP is described as follows in Japanese Unexamined Patent Application Publication No. 2006-005833 and Japanese Unexamined Patent Application Publication No. 2006-279730.

SUMMARY

It is assumed that a channel band between the transmission side communication device and the reception side communication device is a broad band, the channel is long, and RTT is long (hereinafter, referred to as high delay). In this case, since the channel is in the broad band circumstance, the congestion window size reaches the reception window size, and the transmission amount of the packet transmitted from the transmission side communication device is determined by the reception window size. That is, the state becomes a state where the flow control is dominant. When the channel is long and the RTT is long (high delay), actually, irrespective of a long period when the reception buffer of the reception side transmission device is empty, the transmission side communication device can transmit only data of the transmission amount corresponding to the reception window size by the flow control. That is, in the broad band and the high delay circumstance, there is a problem that a throughput does not increase by restriction based on the flow control.

It is desired to provide a technique of a communication device capable of improving a throughput in a broad band and high delay circumstance.

According to an embodiment of the present disclosure, there is provided a communication device including: a communication unit that receives a reception window size from a reception side communication device and transmits a packet of a transmission amount corresponding to a transmission window size to the reception side communication device; and a control unit that determines whether a channel with respect to the reception side communication device is in a broad band and high delay circumstance, changes a first state where the transmission window size is a first window size which is not larger than the reception window size to a second state where the transmission window size is a second window size which is larger than the reception window size when the channel is determined to be in the broad band and high delay circumstance, and transmits the packet of the transmission amount larger than the reception window size in the second state.

In the communication device, in the case of the broad band and high delay circumference, the transmission window size is the size (the second window size) larger than the reception window size, and the packet of the transmission amount larger than the reception window size is transmitted. Accordingly, under the broad band and high delay circumstance, it is possible to improve the throughput.

In the communication device, the communication unit may receive an acknowledgement from the reception side communication device. The control unit may transmit the packet from the transmission unit at the timing when the acknowledgement is received, may predict a period when the transmission of the packet is interrupted from the reception timing of the acknowledgement in the second state, and may additionally transmit the packet from the transmission unit in the period.

In the communication device, it is possible to additionally transmit the packet at the proper timing in the reception side communication device.

In the communication device, the control unit may disperse the packet within the period and may transmit the packet from the transmission unit.

As described above, it is possible to avoid the burst transmission by dispersedly transmitting the packet. Accordingly, it is possible to prevent the packet from being lost en route in the channel.

In the communication device, the control unit may determine whether or not the acknowledgement is intensively received within a predetermined time in the second state, and may partially restrict the transmission of the packet according to the reception timing of the acknowledgement when the acknowledgement is intensively received.

As described above, when the acknowledgement is intensively received, the transmission of the packet corresponding to the reception timing of the acknowledgement is partially restricted to avoid the burst transmission. Accordingly, it is possible to prevent the packet en route in the channel from being lost.

In the communication device, the control unit may detect loss of the transmitted packet in the channel, and may change the second state where the transmission window size is the second window size to a third state where the transmission window size is a third window size smaller than the second window size when the loss of the packet is detected in the second state.

Accordingly, it is possible to appropriately retransmit the lost packet.

In the communication device, when the second state is changed to the third state, the control unit may consider that the already transmitted packet larger than the third window size is not transmitted.

As described above, the already transmitted packet larger than the third window size is considered as being not transmitted, and thus it is possible to rapidly recover from the error caused by the packet loss.

In the communication device, the third window size may be larger than the reception window size.

As described above, the third window size is larger than the reception window size, and thus it is possible to further rapidly recover from the error caused by the packet loss.

In the communication device, the communication unit may receive a selection acknowledgement from the reception side communication device, and the control unit may correct the third window size on the basis of the selection acknowledgement.

Accordingly, it is possible to further rapidly recover from the error caused by the packet loss.

In the communication device, the control unit may determine a frequency of changing the second state to the third state, and may restrict the transmission of the packet of the transmission amount larger than the reception window size in the second state when the frequency is larger than a predetermined threshold value.

Accordingly, when the retransmission caused by the packet loss frequently occurs, the transmission of the packet larger than the reception window size is restricted.

In the communication device, the control unit may variably control the second window size according to the frequency of changing the second state to the third state.

Accordingly, for example, when the retransmission of the packet frequently occurs, the second window size is increased, and when the retransmission of the packet does not frequently occur, the second window size is decreased. In such a manner, it is possible to appropriately change the second window size.

According to another embodiment of the present disclosure, there is provided a communication system including: a reception side communication device; and a transmission side communication device that includes a communication unit receiving a reception window size from the reception side communication device and transmitting a packet of a transmission amount corresponding to a transmission window size to the reception side communication device, and a control unit determining whether a channel with respect to the reception side communication device is in a broad band and high delay circumstance, changing a first state where the transmission window size is a first window size which is not larger than the reception window size to a second state where the transmission window size is a second window size which is larger than the reception window size when the channel is determined to be in the broad band and high delay circumstance, and transmitting the packet of the transmission amount larger than the reception window size in the second state.

According to still another embodiment of the present disclosure, there is provided a program for causing a communication device to execute: receiving a reception window size from a reception side communication device; transmitting a packet of a transmission amount corresponding to a transmission window size to the reception side communication device; determining whether or not a channel with respect to the reception side communication device is in a broad band and high delay circumstance; changing a first state where the transmission window size is a first window size which is not larger than the reception window size to a second state where the transmission window size is a second window size which is larger than the reception window size when the channel is determined to be in the broad band and high delay circumstance; and transmitting the packet of the transmission amount larger than the reception window size in the second state.

According to still another embodiment of the present disclosure, there is provided a communication method including: receiving a reception window size from a reception side communication device; transmitting a packet of a transmission amount corresponding to a transmission window size to the reception side communication device; determining whether or not a channel with respect to the reception side communication device is in a broad band and high delay circumstance; changing a first state where the transmission window size is a first window size which is not larger than the reception window size to a second state wherein the transmission window size is a second window size which is larger than the reception window size when the channel is determined to be in the broad band and high delay circumstance; and transmitting the packet of the transmission amount larger than the reception window size in the second state.

As described above, according to the embodiments of the present disclosure, it is possible to provide the technique of the communication device capable of improving the throughput in the broad band and high delay circumstance.

DETAILED DESCRIPTION OF EMBODIMENTS

Configuration of Communication System and Communication Device

Figure 1:
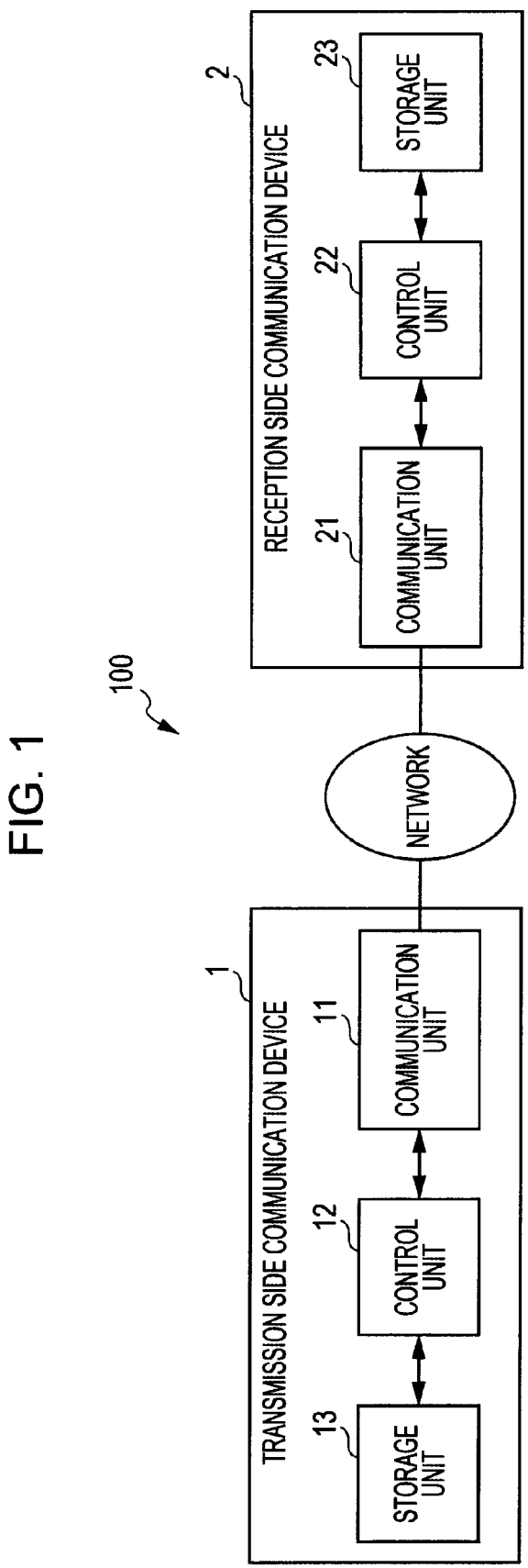
FIG. 1 is a diagram illustrating a communication system according to an embodiment of the present disclosure.

Hereinafter, embodiments of the present disclosure will be described with reference to the drawings. FIG. 1 is a diagram illustrating a communication system 100 according to an embodiment.

As shown in FIG. 1, the communication system 100 includes a transmission side communication device 1 and a reception side communication device 2 connected to each other through a network. The transmission side communication device 1 is a data transmission side communication device, and the reception side communication device 2 is a data reception side communication device. The communication devices 1 and 2 may be, for example, a server, a PC (Personal Computer), and a mobile phone, but are not limited thereto.

The transmission side communication device 1 includes a communication unit 11, a control unit 12, and a storage unit 13. Similarly, the reception side communication unit 11 also includes a communication unit 21, a control unit 22, and a storage unit 23. The control units 12 and 22 are, for example, a CPU, and integrally control the units of the communication devices 1 and 2. The storage units 13 and 23 include a HDD (Hard Disk Drive) and an SSD (Solid State Drive) storing various programs necessary for the control of the communication devices 1 and 2 and various kinds of data. The storage units 13 and 23 include a nonvolatile memory (e.g., a RAM (Random Access Memory)) used as a work area of the control unit 12.

The communication unit 11 of the transmission side communication device 1 transmits a packet including data to be transmitted, to the reception side communication device 2, or receives a packet from the reception side communication device 2. The communication unit 11 of the reception side communication device 2 receives the packet transmitted from the transmission side communication device 1, or transmits a packet including information such as an acknowledgement (ack) to the transmission side communication device 1.

Description of Operation

Next, an operation of the communication system 100 according to the embodiment will be described.

The communication system 100 according to the embodiment has a first state where normal transmission of the packet is performed according to normal TCP, and a second state where expansion transmission of the packet is performed according to OTCP (Optimistic TCP) according to characteristics of the embodiment.

Operation According to Normal TCP

First, a case where the communication system 100 performs communication according to the normal TCP will be described. The communication system 100 establishes TCP connection by 3-way handshake. In the 3-way handshake, an MSS (Maximum Segment Size) is determined. When the data transmitted from the transmission side communication device 1 is larger than the MSS, the data is divided into a plurality of packets on the transmission side.

In the communication system 100, a slide window manner is employed, and the transmission side communication device 1 slides the transmission window when the acknowledgement arrives, to sequentially transmit the packet to the reception side transmission device.

In the communication system 100, a flow control and a congestion control are performed. In the flow control, the reception side communication device 2 reports the reception window size (Rwnd) to the transmission side communication device 1 when transmitting the acknowledgement (ack). In this case, the reception side communication device 2 puts the current window size into the field of the reception window size existing in a TCP header, and transmits it to the transmission side communication device 1. The transmission window size is a size smaller than the reception window size, and thus the packet transmitted from the transmission side is prevented from overflowing from the reception buffer of the reception device.

In the congestion control, a congestion window is set in the transmission side communication device 1, and the transmission side communication device 1 controls the congestion window size (Cwnd) according to a slow start algorithm or a congestion avoidance algorithm. In the slow start algorithm, the congestion window size is set to 1 MSS (Maximum Segment Size) for the first time, and the congestion window size gradually increases. In the congestion avoidance algorithm, a process of detecting the congestion from the loss of the packet or the change of the RTT (Round Trip Time) and adjusting the congestion window size is performed.

The transmission amount of the packet transmitted from the transmission device is a transmission amount corresponding to the smaller sized window of the congestion window size and the reception window.

Operation of OTCP

Next, the OTCP (optimistic TCP) will be described.

Figure 2:
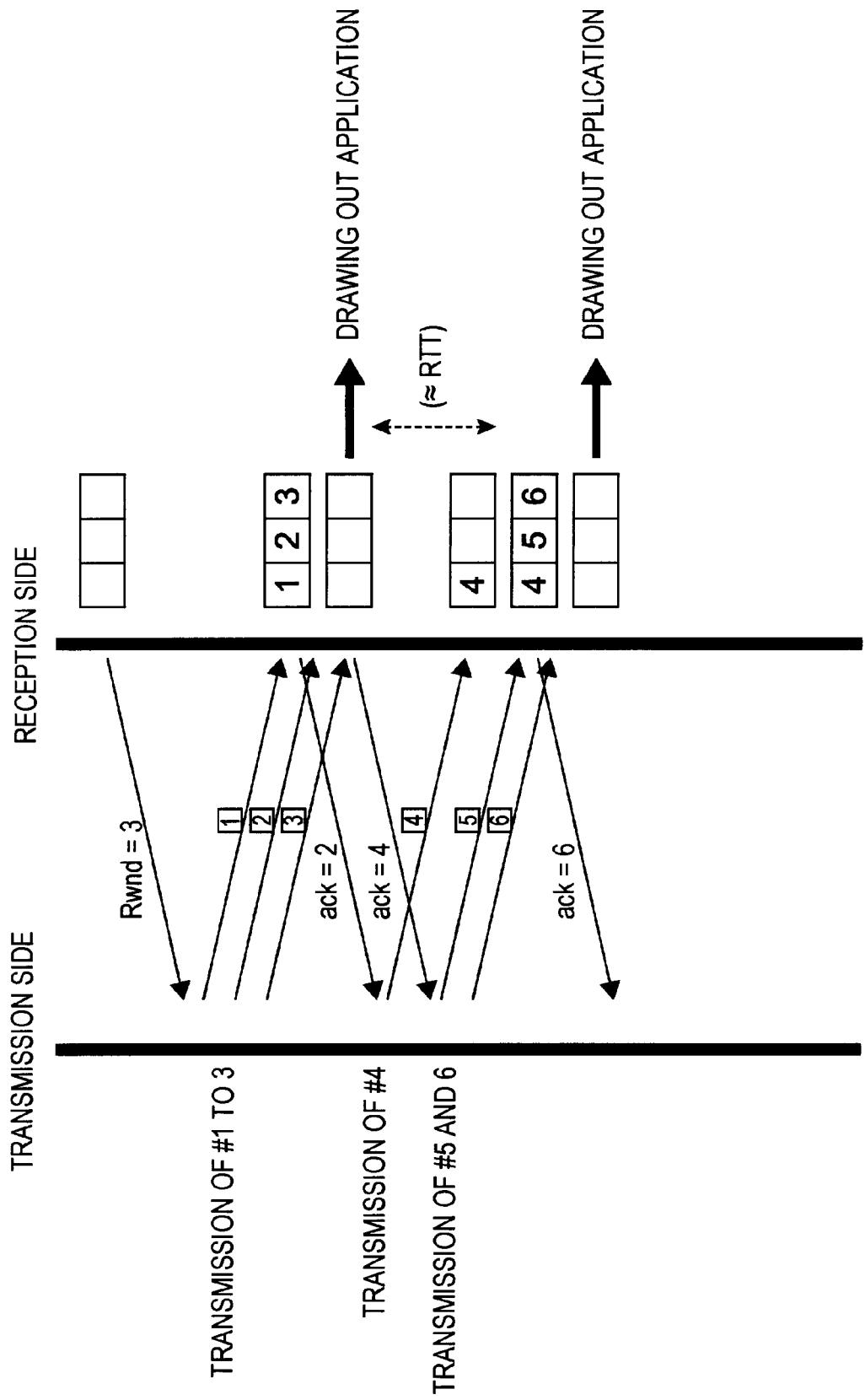
FIG. 2 is a diagram illustrating a basic concept of OTCP.
Figure 3:
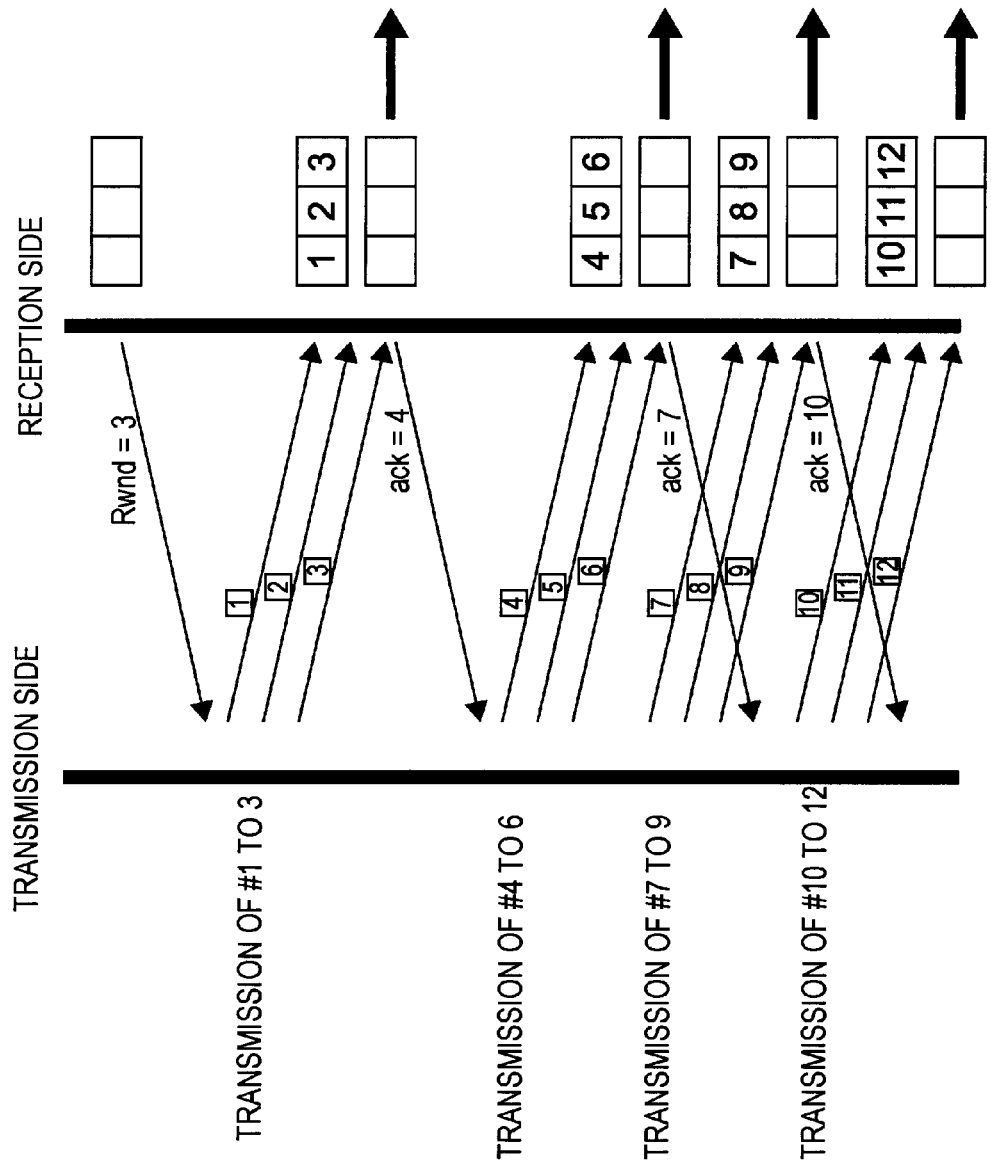
FIG. 3 is a diagram illustrating a basic concept of OTCP.

First, a basic concept of the OTCP will be described. FIG. 2 and FIG. 3 are diagrams illustrating a basic concept of the OTCP. In FIG. 2 and FIG. 3, to allow easy understanding, the reception window size (Rwnd), the reception buffer size, and the like are set smaller than the actual size.

As shown in FIG. 2, when the reception window size (in this example, Rwnd=3) is reported from the reception side communication device 2, the transmission side communication device 1 transmits the first to third packets to the reception side communication device 2 according to the reported reception window size. The reception side communication device 2 stores the first to third packets in the reception buffer, and the application program extracts the first to third packets stored in the reception buffer from the reception buffer.

The reception side communication device 2 transmits the acknowledgement of ack=2 to the transmission side communication device 1 when the first packet is received, and transmits the acknowledgement of ack=4 to the transmission side communication device 1 when the second and third packets are received. The transmission side communication device 1 slides the transmission window and transmits the fourth packet when the acknowledgement of ack=2 is received, and transmits the fifth and sixth packets when the acknowledgement of ack=4 is received.

The reception side communication device 2 stores the fourth and fifth packets in the reception buffer, and the application program extracts the fourth and fifth packets stored in the reception buffer from the reception buffer.

A period indicated by a broken line on the right side of FIG. 2 is substantially the same period as the RRT. For example, the long RTT and high delay circumstance may be assumed for the reason that the transmission side communication device 1 and the reception side communication device 2 are separated distantly from each other (e.g., between Japan and the US). As described above, in the long RTT and high delay circumstance, a period when the reception buffer of the reception side communication device 2 is empty is long.

Referring to FIG. 3, when the reception buffer is empty, the packet is additionally transmitted and arrives from the transmission device side. Accordingly, in the OTCP, the packet is additionally transmitted (see the seventh to ninth packets) in the period when the reception buffer is empty.

The operation shown in FIG. 3 will be briefly described with reference to the transmission side communication device 1. When the reception window size (Rwnd=3) is reported, the transmission side communication device 1 transmits the first to third packets to the reception side communication device 2 according to the reported reception window size. When the acknowledgement of ack=4 is received, the transmission side communication device 1 transmits the fourth to sixth packets. The transmission side communication device 1 additionally transmits the seventh and ninth packets before the acknowledgement of ack=7 is received. At this time, since the reception buffer is empty, the additionally transmitted seventh to ninth packets reach the reception side communication device 2.

Conversion Between Normal Transmission Based on TCP and Expansion Transmission Based on OTCP Next, a process of the transmission side communication device 1 will be described in detail. First, the conversion between the normal transmission based on the TCP and the expansion transmission based on the OTCP will be described.

Figure 4:
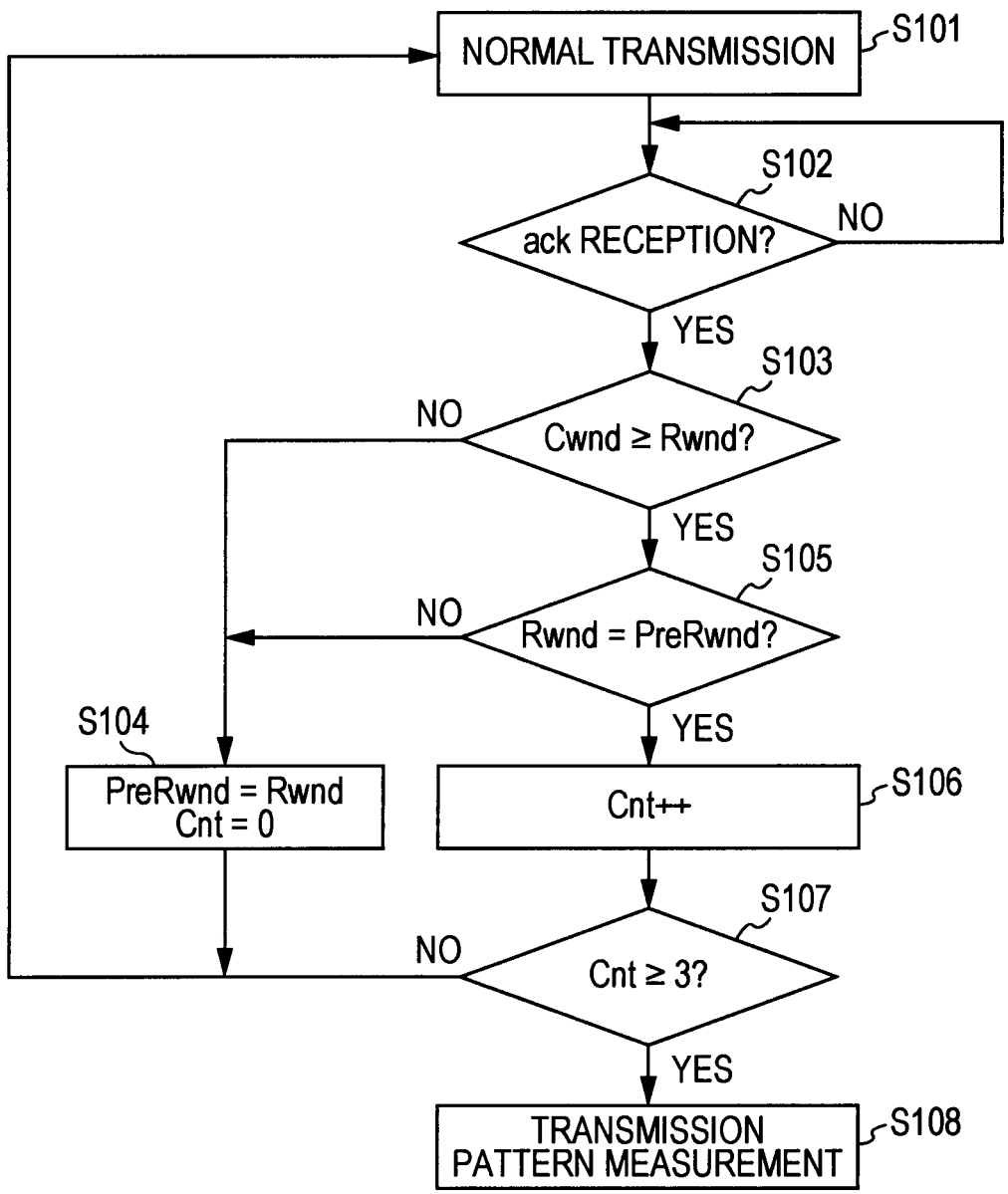
FIG. 4 is a flowchart illustrating an operation when normal transmission based on TCP and expansion transmission based on OTCP are changed.

FIG. 4 is a flowchart illustrating the process of the transmission side communication device 1 at that time. FIG. 5A to FIG. 5D are diagrams illustrating the transmission window size (congestion window size) in each state such as expansion transmission.

Figure 5:
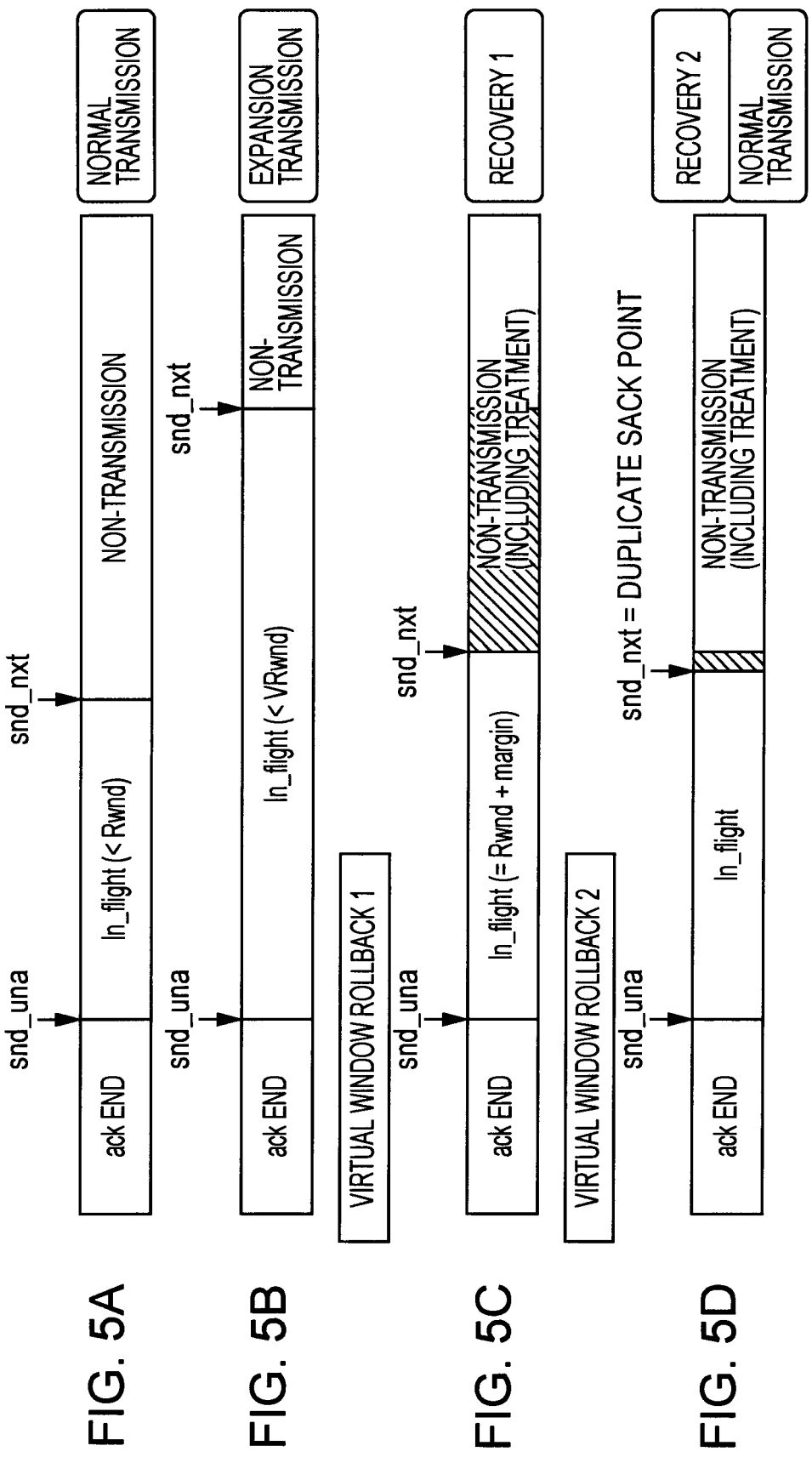
FIG. 5A to FIG. 5D are diagrams illustrating a transmission window size (congestion window size) in each state such as expansion transmission, in the normal transmission.

In Step S101, the control unit 12 of the transmission side communication device 1 performs the normal transmission on the basis of the normal TCP. The normal transmission based on the normal TCP is as described above. As shown in FIG. 5A, during the normal transmission, the transmission window size (the first transmission window size) (snd_una to snd_una) is set smaller than the reception window size.

In Step S102, the control unit 12 determines whether or not the acknowledgement (ack) transmitted from the reception side communication device 2 is received. When the acknowledgement (ack) is received (Step S102: Yes), the control unit 12 determines whether or not the congestion window size (Cwnd) is equal to or larger than the reception window size (Rwnd) (Step S103). The reception window size is reported from the reception side communication device 2 with the acknowledgement by the packet.

When the congestion window size is smaller than the reception window size (Step S103: No), the process proceeds to Step S104. In Step S104, the control unit 12 causes the reception window size (PreRwnd) at the previous ack reception time to be the currently received reception window size (Rwnd), and causes a count value (Cnt) of a counter to be zero. Then, the process returns to Step S101.

When the congestion window size is equal to or larger than the reception window size (Step S103: Yes), the control unit 12 determines whether or not the currently received reception window size (Rwnd) is equal to the reception window size (PreRwnd) at the previous ack reception time (Step S105). When the current reception window size is not equal to the previous reception window size (Step S105: No), the control unit 12 proceeds to Step S104. The previous reception window size (PreRwnd) is caused to be the current reception window size (Rwnd), and the count value (Cnt) of the counter is caused to be zero. The process returns to Step S101.

When the current reception window size is equal to the previous reception window size (Step S105: Yes), the control unit 12 adds 1 to the count value of the counter (Step S106).

Then, the control unit 12 determines whether or not the count value is equal to or more than 3 (Step S107). When the count value is less than 3 (Step S107: No), the control unit 12 returns to Step S101.

Meanwhile, when the count value is equal to or more than 3 (Step S107: Yes), the control unit 12 measures a transmission pattern of the packet (Step S108).

In the processes shown in Steps S101 to S107, the control unit 12 determines whether or not the channel between the transmission side communication device 1 and the reception side communication device 2 is in the broad band and high delay (RTT is long). That is, when the channel is in the narrow band circumstance or in the low delay (RTT is short) circumstance, the congestion window size does not reach the reception window size. Meanwhile, when the channel is in the broad band and high delay circumstance, the congestion window size reaches the reception window size. In Steps S101 to S107, it is determined whether or not the channel is in the broad band and high delay circumstance using this relationship. When it is determined that the channel is in the broad band and high delay circumstance, the expansion transmission based on the OTCP is performed (see FIG. 3 and FIG. 6).

Measurement of Transmission Pattern of Packet to Expansion Transmission

Figure 6:
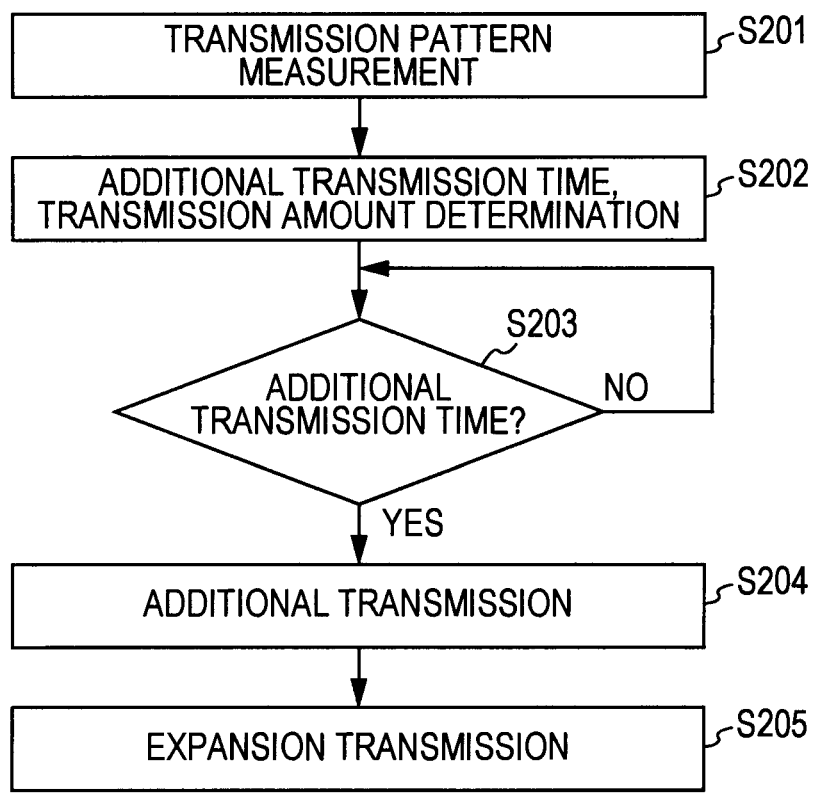
FIG. 6 is a flowchart illustrating a process from measurement of a transmission pattern of a packet to expansion transmission.

FIG. 6 is a flowchart illustrating a process from the measurement of the transmission pattern of the packet to the expansion transmission.

As shown in FIG. 6, the control unit 12 measures the transmission pattern of the packet before the expansion transmission (Step S201). The control unit 12 determines an additional transmission time and an additional transmission amount according to the measured measurement pattern (Step S202). Then, the control unit 12 determines whether or not it is the additional transmission time determined in Step S202 (Step S203). When it is the additional transmission time (Step S203: Yes), the control unit 12 transmits the packet of the additional transmission amount determined in Step S202 (Step S204). In Step S204, the additional transmission is performed at the timing other than the timing of receiving the acknowledgement from the reception side communication device 2. Then, the expansion transmission based on the OTCP is performed (Step S205).

Prediction of Transmission Interruption Period of Packet

Figure 7:
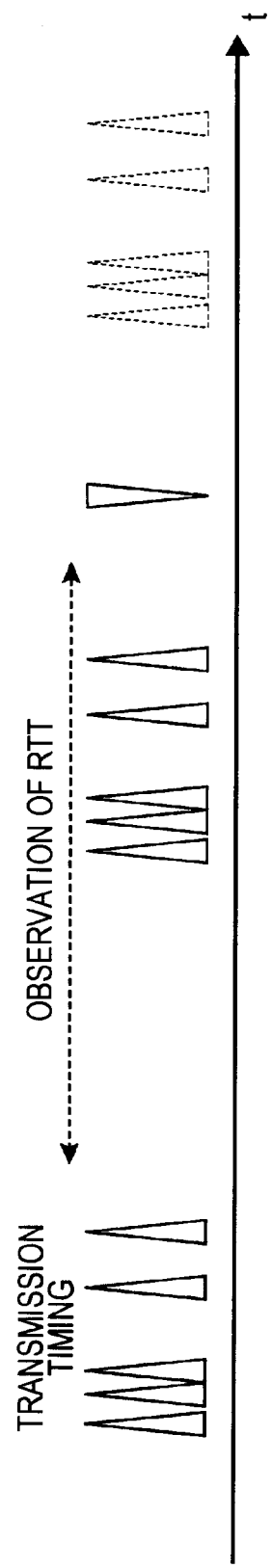
FIG. 7 is a diagram illustrating prediction of a packet transmission interruption period, and is a diagram illustrating a transmission timing of a packet.

In Step S201 shown in FIG. 6, the transmission pattern is measured to predict the transmission interruption period of the packet. FIG. 7 is a diagram illustrating the prediction of the packet transmission interruption period, and a diagram illustrating the transmission timing of the packet. In FIG. 7, a triangle represented by a solid line indicates the transmission timing of the packet during an observation period, and a triangle represented by a broken line indicates the transmission timing of the packet to be transmitted from the current time, which is analogized by the observation. In FIG. 7, an inverted triangle indicates the middle of the period when it is expected that the transmission of the packet will be interrupted.

As described above, during the normal transmission, the transmission window is slid at the timing of receiving the ack to transmit the packet. The ack is an acknowledgement signal representing that the packet previously transmitted by the transmission side communication device 1 reaches the reception device. Accordingly, basically, the packet from the transmission side reception device is transmitted in a similar pattern for each RTT. Although the pattern may slightly deviate due to various reasons such as self-clocking, the transmission pattern thereafter becomes a periodically similar pattern for each RTT even when the pattern slightly deviates.

Accordingly, the control unit 12 measures the transmission pattern of the packet, and thus can predict the period when the transmission of the packet is interrupted. In the measurement of the transmission pattern, typically, as shown in FIG. 7, when the transmission pattern of the packet of 1 RTT is measured, it is possible to predict the position where the transmission of the packet is interrupted. In this case, the start point and the end point of the transmission pattern may be at any position.

The transmission side communication device 1 can additionally transmit the packet to the reception side communication device 2 at the proper timing.

Figure 8:
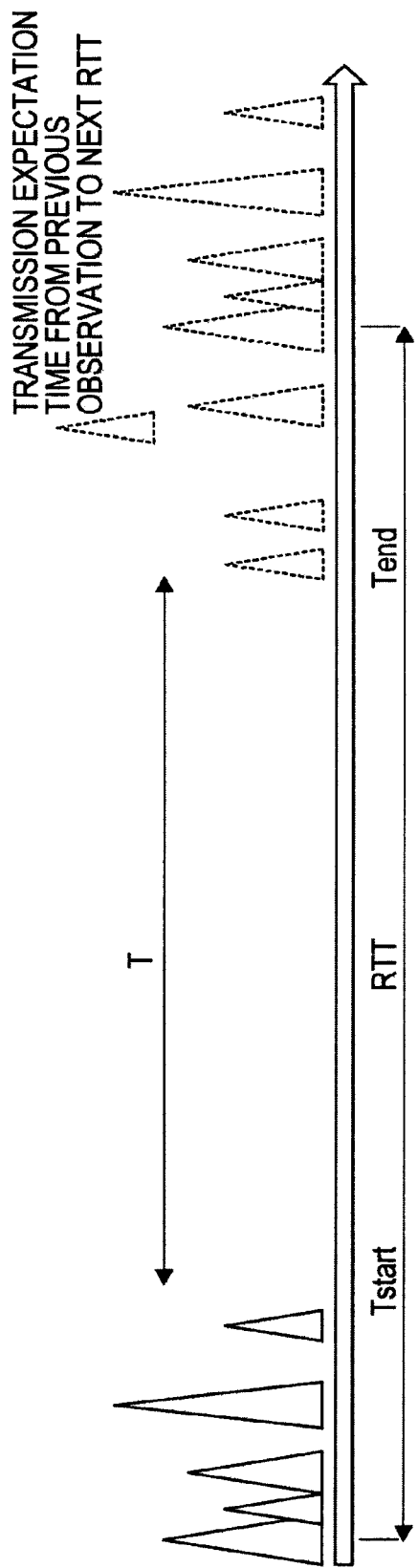
FIG. 8 is a diagram illustrating a process when an additional transmission time and an additional transmission amount are determined.
Figure 9:
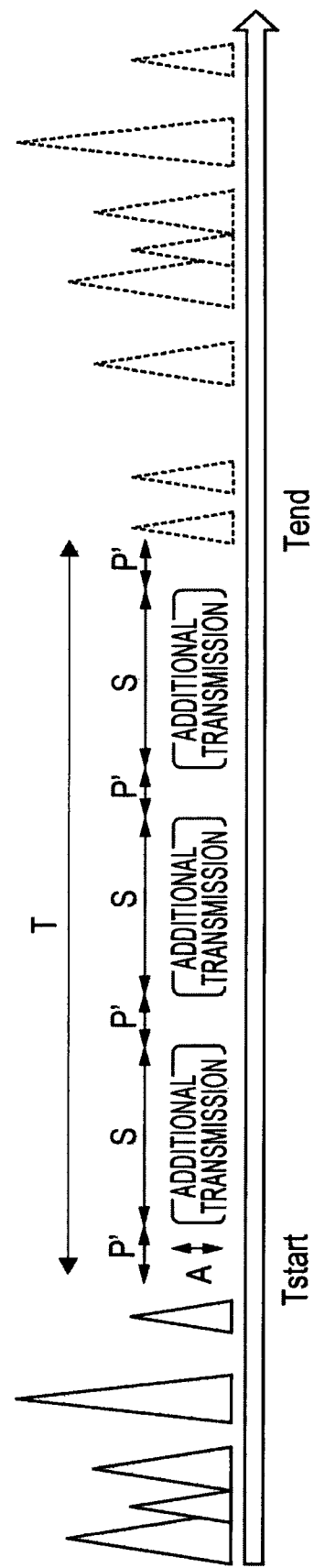
FIG. 9 is a diagram illustrating a process when an additional transmission time and an additional transmission amount are determined.

Determination of Additional Transmission Time and Additional Transmission Amount FIG. 8 and FIG. 9 are diagrams illustrating a process when the additional transmission time and the additional transmission amount are determined. In FIG. 8 and FIG. 9, a triangle represented by a solid line indicates the transmission timing of the already transmitted packet, and a triangle represented by a broken line indicates the transmission timing to be transmitted from the current time.

Referring to FIG. 8, the maximum empty time of the transmission timing is T. The start time Tstart and the end time Tend of the next prediction maximum empty time T are points at which the start time and the end time of the previous maximum empty time proceeds by RTT. The control unit 12 calculates (predicts) the prediction maximum empty time T from the transmission pattern of the packet, and performs the additional transmission at the time T. In this case, when the control unit 12 transmits the packet without any restriction at the prediction maximum empty time T, burst may occur. In the embodiment, the transmission side communication device 1 disperses the packet at the prediction maximum empty time T, and transmits the packet to the reception side communication device 2.

Referring to FIG. 9, as a countermeasure for the burst, the control unit 12 causes the maximum number of packets which can be transmitted per 1 ms to be A. Even when the number of packets is restricted and the packets are transmitted, the burst may occur. When the packet is transmitted during S ms, the control unit 12 performs a process of pausing the transmission of the packet for more than P ms. The P ms is a time when the transmission of the packet is minimally paused.

The control unit 12 acquires the maximum n satisfying the condition of $T>nS+(n+1)P$. In the example shown in FIG. 9, n is 3. Then, the control unit 12 acquires P' by $P'=(T-nS)/(n+1)$. The P' is a time when the transmission of the packet is actually paused with respect to the prediction maximum empty time T. When the control unit 12 acquires the P', the control unit 12 acquires the time to perform the additional transmission for the first time by Tstart+P'. Similarly, the control unit 12 can acquire the pause time and the restart time of the transmission. The control unit 12 performs the additional transmission at the additional transmission time acquired as described above (see Steps S203 and S204 in FIG. 6).

The additional transmission amount during the prediction maximum empty time T is determined by nSA. The control unit 12 increases the transmission window size (congestion window size) by 1, A times per 1 ms, during the additional transmission time, and performs the additional transmission by the increase (see FIG. 5B). That is, the control unit 12 makes the transmission window size larger than the reception window size reported from the reception side communication device 2 during the expansion transmission, and performs the additional transmission of the packet. In the following description, the transmission window size (the second transmission window size) enlarged from the reception window reported from the reception side communication device 2 may be referred to as a virtual window size (VRwnd).

As shown in FIG. 9, it is possible to avoid the burst transmission by dispersedly transmitting the packet. Accordingly, it is possible to prevent the packet from being lost en route in the channel.

Prevention of Burst Transmission of Packet with Respect to Acknowledgement (ack)

Next, the prevention of the burst transmission of the packet with respect to the acknowledgement (ack) will be described.

The control unit 12 performs the transmission of the packet with respect to the acknowledgement. When the acknowledgement is burst and received (burst ack), the transmission of the packet with respect to the acknowledgement may be burst. Results of a test actually conducted by the inventors showed that although the acknowledgement (ack) transmitted by the reception side communication device 2 is not burst, the acknowledgement may burst and be received by the transmission side communication device 1. The control unit 12 of the transmission side communication device 1 controls the transmission of the packet so as not to be the burst transmission.

Figure 10:
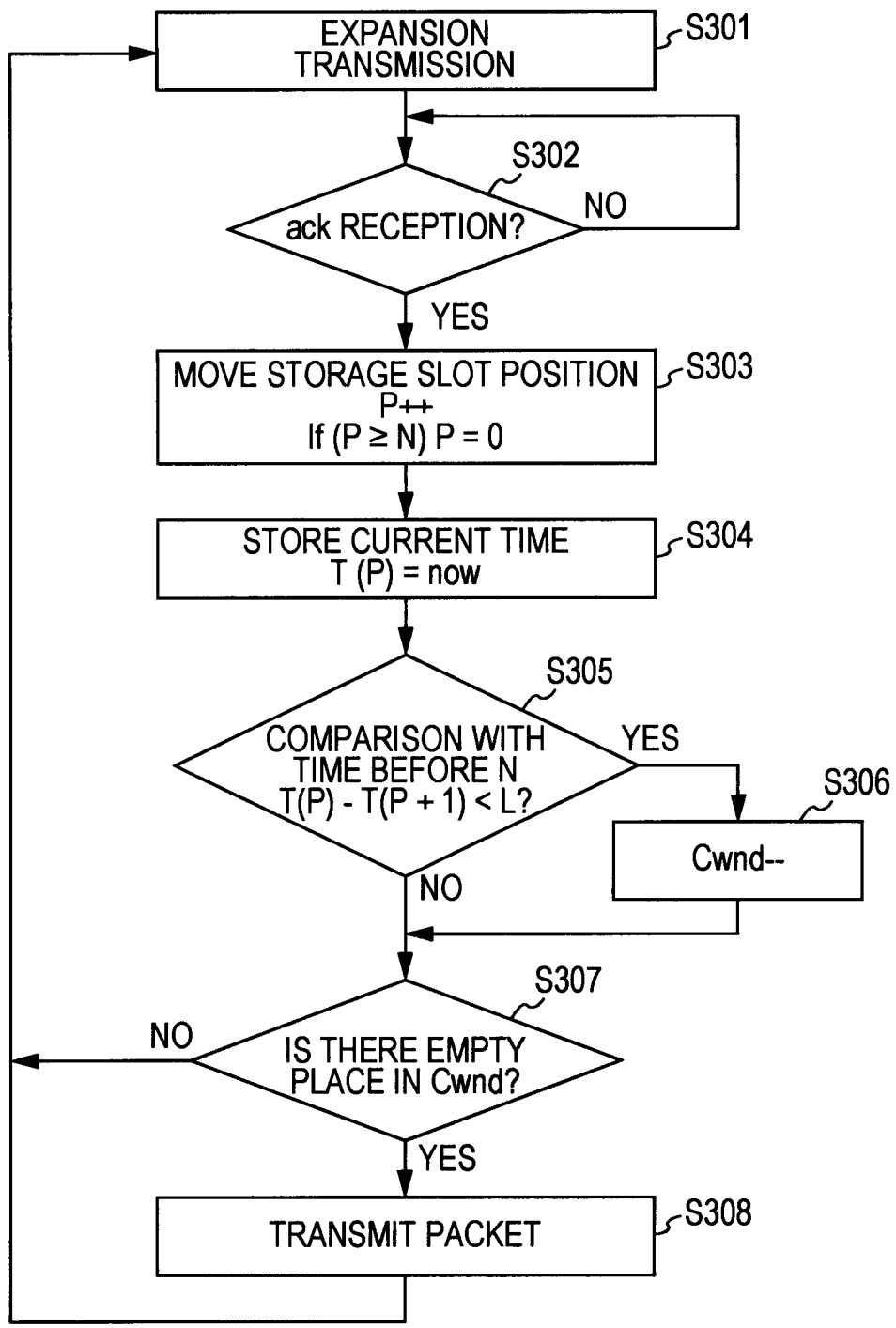
FIG. 10 is a flowchart illustrating a process when burst transmission to burst ack is prevented.
Figure 11:
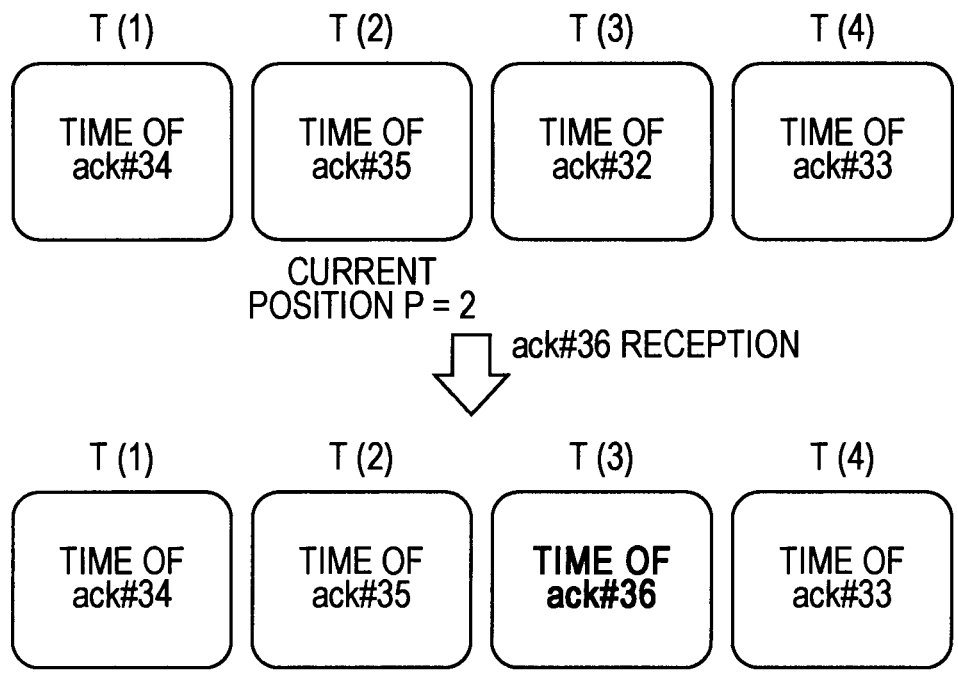
FIG. 11 is a supplementary diagram illustrating the process shown in FIG. 10, and is a diagram illustrating change of the time stored in a memory slot.

FIG. 10 is a flowchart illustrating a process when the burst transmission with respect to the burst ack is prevented. FIG. 11 is a supplementary diagram illustrating the process shown in FIG. 10, and a diagram illustrating the change of the time stored in a memory slot.

During the expansion transmission based on the OTCP (Step S301), the control unit 12 determines whether or not the acknowledgement (ack) is received (Step S302). When the acknowledgement is received (Step S302: Yes), the control unit 12 adds 1 to the position P of the memory slot (Step S303). Before the control unit 12 adds 1 to the position P of the memory slot, the control unit 12 determines whether or not the position P of the memory slot is equal to or more than the number N of memory slots. When the determination is positive, the position P of the memory slot is set to 0. In the example shown in FIG. 11, the number N of memory slots is 4.

When the control unit 12 adds 1 to the position P of the memory slot, the control unit 12 stores the current time (T(P)) in the memory slot (Step S304). For example, as shown in FIG. 11, when the ack #36 is received, the control unit 12 overwrites the time of the ack #36 on the time of the ack #32 and stores the time in the memory slot.

Then, the control unit 12 compares the current time (T(P)) and the time (T(P+1)) stored before N, and determines whether or not a difference between the current time (T(P)) and the time (T(P+1)) stored before N is less than L ms (e.g., 10 ms) (Step S305). As shown in FIG. 11, it is possible to calculate the difference between the current time (T(P)) and the time (T(P+1)) stored before N by comparing the ack #36 and the ack #33 in the case of P=3.

When the difference between the current time (T(P)) and the time (T(P+1)) stored before N is equal to or more than L ms (Step S305: No), the process proceeds to Step S307.

Meanwhile, when the difference between the current time (T(P)) and the time (T(P+1)) stored before N (N=4) is less than L ms (Step S305: Yes), 1 is subtracted from the window size (Cwnd) (transmission window size). Then, the process proceeds to Step S307.

In Step S307, it is determined whether or not there is an empty place in the congestion window. When there is no empty place in the congestion window (Step S307: No), the process returns to Step S301 and the process and the processes after Step S301 are performed. Meanwhile, when there is the empty place in the congestion window (Step S307: Yes), the packet is transmitted with respect to the acknowledgement (Step S308).

The transmission of N or more packets is restricted within the time of L ms by the process described above. Accordingly, it is possible to prevent the burst transmission with respect to the burst ack.

Recovering from Error During Expansion Transmission (1)

Next, the recovering from the error during the expansion transmission will be described.

In the general TCP technique, a method is used in which the reception side communication device 2 reports non-transmission of the previous packet to the transmission side communication device 1 when the packets are not sequentially transmitted and the packet to be received later is previously received. In this case, the reception side communication device 2 returns the acknowledgement (ack) as before to the transmission side communication device 1, to report that the previous packet has not yet been received.

A problem of recovery when an error occurs during the expansion transmission based on the OTCP will be described.

Figure 12:
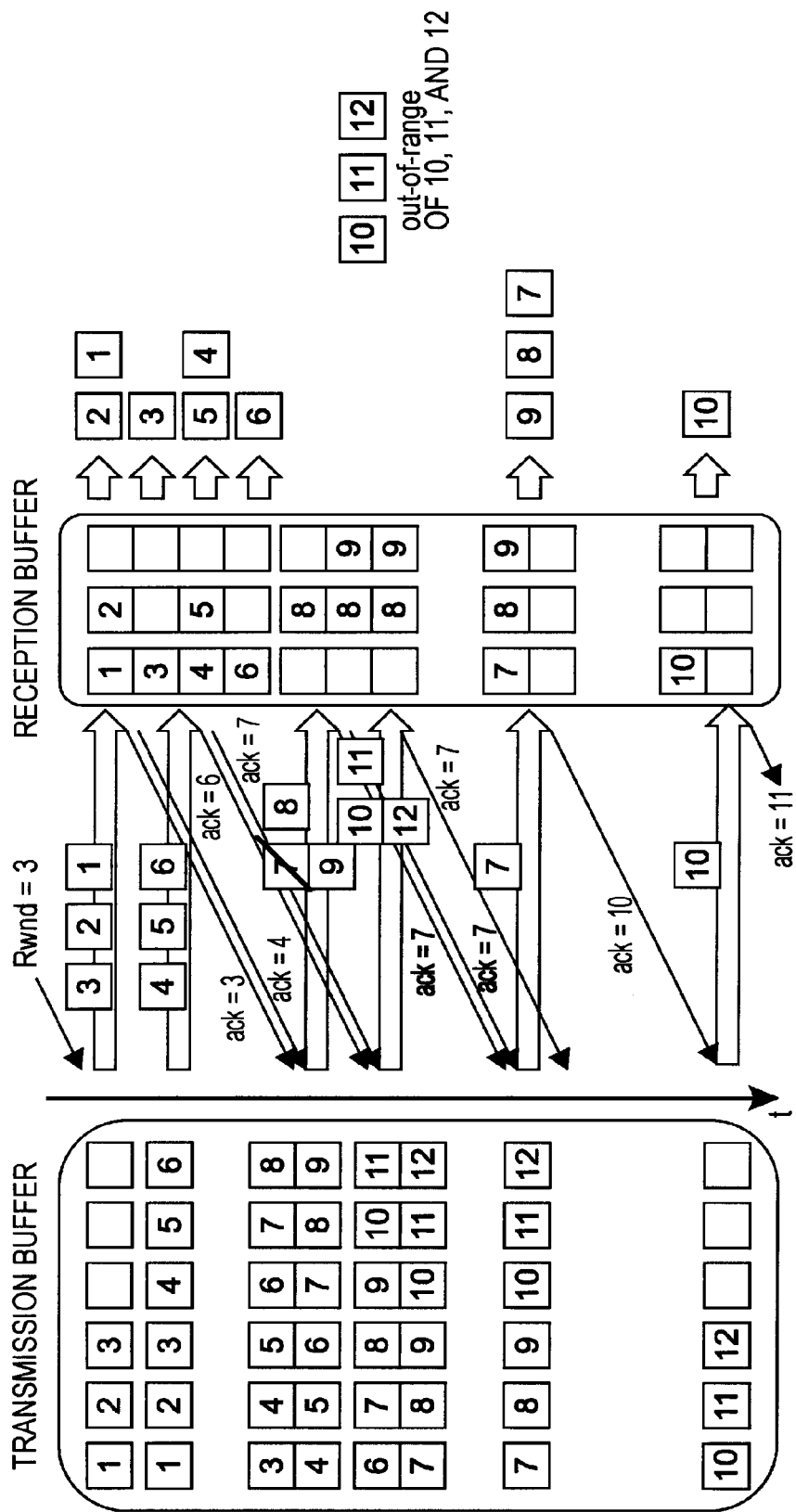
FIG. 12 is a sequence diagram illustrating a recovery problem when an error occurs during the expansion transmission based on OTCP.

FIG. 12 is a sequence diagram illustrating the problem of recovery when the error occurs during the expansion transmission based on OTCP.

When the reception window size (in this example, Rwnd=3), is reported from the reception side communication device 2, the transmission side communication device 1 (the control unit 12) transmits the first to third packets to the reception side communication device 2 according to the reported reception window size. When the first and second packets and the third packet are received, the reception side communication device 2 returns ack=3 and ack=4 to the transmission side communication device 1.

The transmission side communication device 1 transmits the fourth to sixth packets in which the transmission window size is larger than the reception window size received from the reception side. In the example shown in FIG. 12, the transmission window size is double the reception window size.

When the fourth, fifth, and sixth packets are received, the reception side communication device 2 returns ack=6 and ack=7 to the transmission side communication device 1.

When ack=3 and ack=4 are received from the reception side communication device 2, the transmission side communication device 1 slides the transmission window to transmit the seventh, eighth, and ninth packets to the reception side communication device 2. In this case, it is considered that the seventh packet is lost. Since the eighth packet is received before the seventh packet is received, the reception side communication device 2 returns the same acknowledgement (ack=7) as the previous acknowledgement to the transmission side communication device 1. Similarly, since the ninth packet is received before the seventh packet is received, the reception side communication device 2 further returns the acknowledgement (ack=7) to the transmission side communication device 1 as before.

When ack=6 and (the first) ack=7 are received, the transmission side communication device 1 transmits the tenth, eleventh, and twelfth packets. The tenth to twelfth packets do not fit to the reception buffer, and overflow from the reception buffer. That is, the packet transmitted over the original reception window size overflows from the reception buffer and is lost.

When ack=7 is received many times, the transmission side communication device 1 determines that the seventh packet is lost, and retransmits the seventh packet to the reception side communication device 2. When the seventh packet is received, the reception side communication device 2 considers that the seventh and ninth packets are normally received, and returns ack=10 to the transmission side communication device 1.

When ack=10 is received, the transmission side communication device 1 retransmits the tenth packet. When the tenth packet is received, the reception side communication device 2 returns ack=11 to the transmission side communication device 1, and the transmission side communication device 1 retransmits the eleventh packet by ack=11. The same process is repeated until the twelfth packet is retransmitted.

That is, in the expansion transmission, the tenth to twelfth packets transmitted over the original reception window size are considered as the lost packet with respect to the transmission side communication device 1, and thus the packets are retransmitted one by one. Accordingly, there is a problem that a time is taken until recovering from the error. The transmission side communication device 1 performs a process of rapidly recovering from the error.

Figure 13:
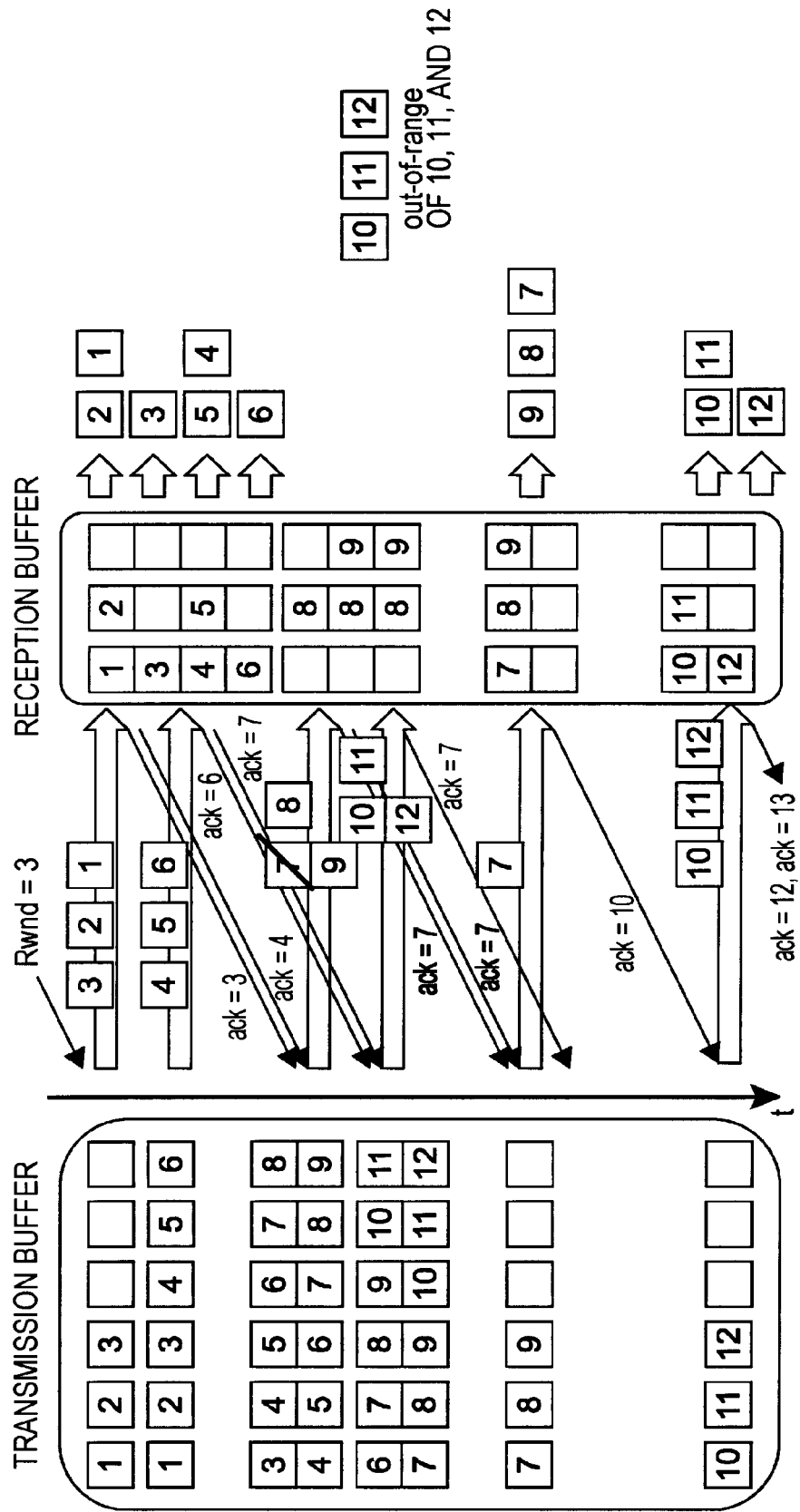
FIG. 13 is a sequence diagram illustrating a process in which the transmission side communication device rapidly recovers from the error.

FIG. 13 is a sequence diagram illustrating the process in which the transmission side communication device 1 rapidly recovers from the error. In the description of FIG. 13, the transmission side communication device 1 receives ack=7 many times. The sequence until the transmission side communication device 1 ack=7 many times is as shown in FIG. 12.

When ack=7 is received many times, the transmission side communication device 1 determines that the seventh packet is lost, and retransmits the seventh packet to the reception side communication device 2. At this time, the transmission side communication device 1 returns the expanded transmission window size (virtual window size) to the original reception window size (Rwnd=3) (third window size). A transmission queue is corrected, and the packet (in the example shown in FIG. 13, the tenth to twelfth packets) which has been already transmitted over the original window size is considered as not being transmitted.

When the seventh packet is received, the reception side communication device 2 considers that the seventh to ninth packets are normally received, and returns ack=10 to the transmission side communication device 1. When ack=10 is received, the transmission side communication device 1 transmits the tenth to twelfth packets to the reception side communication device 2.

That is, the transmission side communication device 1 considers that the packets (the tenth to twelfth packets) transmitted over the original reception window size are not transmitted, and are not considered as the lost packet. Accordingly, there is no case where the packets (the tenth to twelfth packets) which have been already transmitted over the original reception window are not retransmitted one by one, and thus it is possible to rapidly recover from the error.

When the recovery from the error is completed, the transmission side communication device 1 performs the expansion transmission again.

Recovering from Error During Expansion Transmission (2)

As described above, the control unit 12 of the transmission side communication device 1 returns the transmission window size to the original reception window size at the recovery time, and considers that the packet transmitted over the original reception window size is not transmitted.

The packet transmitted over the original reception window size can be acquired as packets-to-rollback=(sent-packets)−(original-window-size).

However, there is a case where the packet transmitted over the original window size may fit to the reception buffer of the reception side transmission device by the timing.

An option field is prepared in a TCP header of TCP, and the reception side communication device 2 can return a selection acknowledgement (sack) to the transmission side communication device 1 by using the option field. The selection acknowledgement (sack) includes information of the number of the already reached packet. The transmission side communication device 1 can recognize a lost packet and a packet which reaches the reception side communication device 2 by the acknowledgement (ack) and the selection acknowledgement (sack).

When the packet transmitted over the original reception window size fits to the reception buffer, the selection acknowledgement (sack) designating an area considered as being not transmitted on the reception side is received as dup_suck to the reception side communication device 2. In this case, the transmission side communication device 1 negates and ignores the selection acknowledgement (sack) designating the area considered as being not transmitted (it is difficult to discriminate from the actually negated case). When the packet transmitted over the original reception window size fits to the reception buffer, the transmission side communication device 1 negates and ignores the acknowledgement ack transmitted from the reception side communication device 2 at the time of completion of the recovery from the error (it is difficult to discriminate from the actually negated case). Accordingly, there is a problem that a time is taken in the recovery from the error.

Even when the packet transmitted over the original reception window size fits to the reception buffer, the transmission side communication device 1 performs the process of rapidly recovering from the error. Hereinafter, this will be described.

Figure 14:
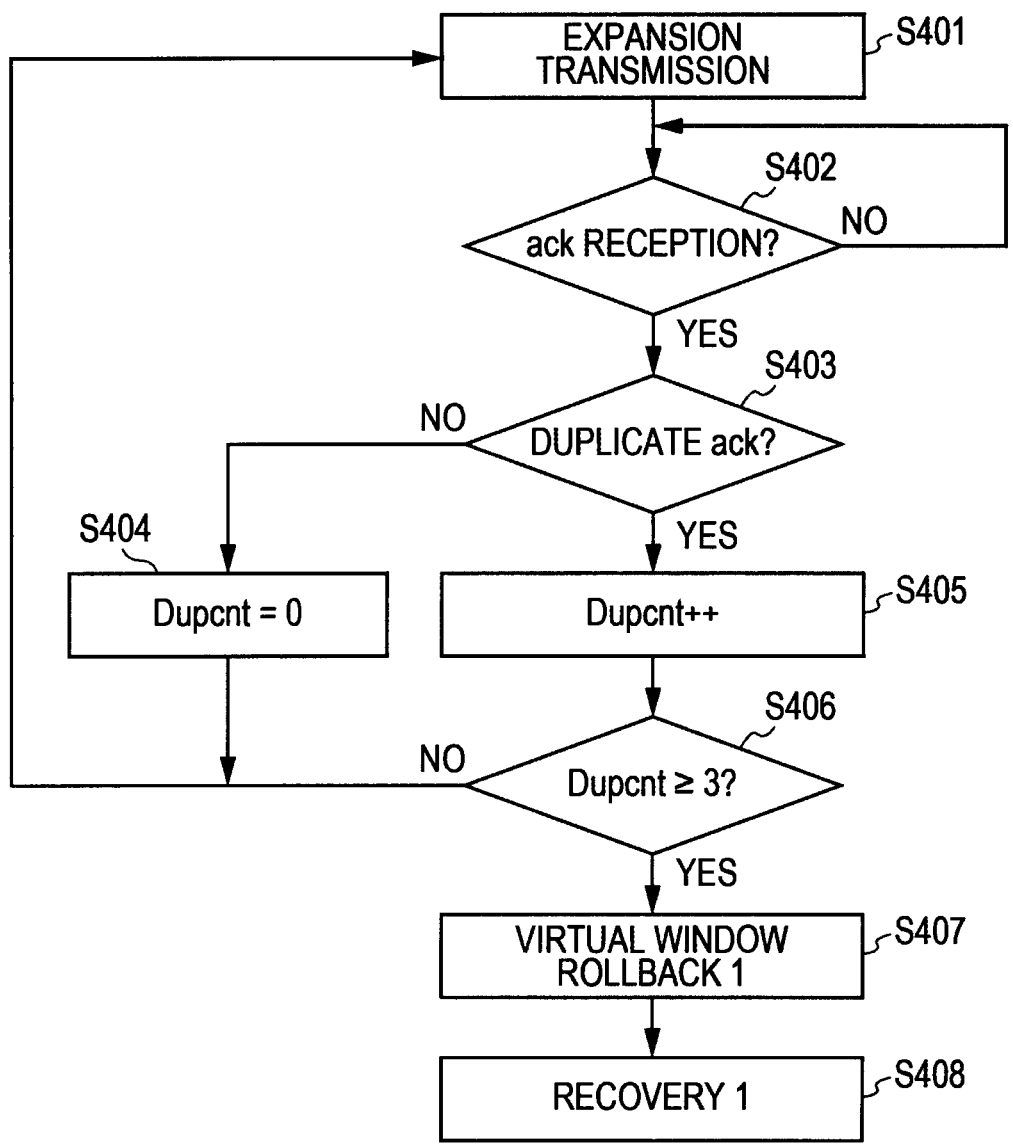
FIG. 14 is a flowchart illustrating a process when recovering from the error.
Figure 15:
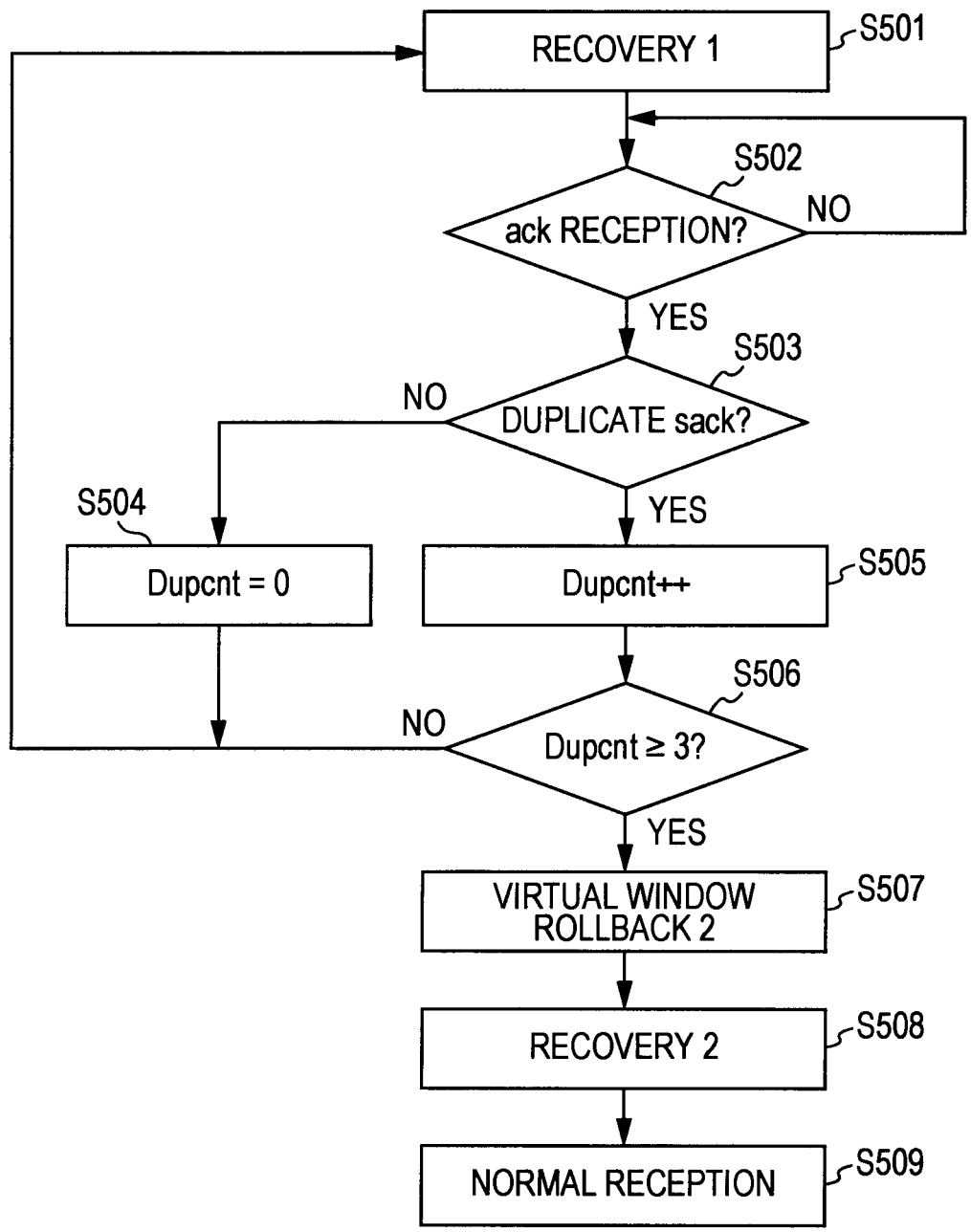
FIG. 15 is a flowchart illustrating a process when recovering from the error.

FIG. 14 and FIG. 15 are flowcharts illustrating a process of recovering from the error.

As shown in FIG. 14, during the expansion transmission based on the OTCP (Step S401), the control unit 12 determines whether or not the acknowledgement (ack) is received (step S402). When the acknowledgement (ack) is received (Step S402: Yes), it is determined whether or not the currently received acknowledgement (ack) is the same as the previously received acknowledgement (Step S403).

When the acknowledgement (ack) is different from the previous acknowledgement (Step S403: No), the control unit 12 makes the count value (dupcnt) of the counter be zero (Step S404), and the process returns to Step S401. Meanwhile, when the acknowledgement (ack) is the same as the previous acknowledgement (Step S403: Yes), the control unit 12 adds 1 to the count value (dupcnt) of the counter (Step S405).

Then, the control unit 12 determines whether or not the count value of the counter is equal to or more than 3 (Step S406). When the count value is equal to or less than 3 (Step S406: No), the control unit 12 returns to Step S401. Meanwhile, when the count value is equal to or more than 3 (Step S406: Yes), the control unit 12 decreases the expanded transmission window size (virtual window size) (Step S407) (FIG. 5B→FIG. 5C). Accordingly, the control unit 12 transfers to the first recovery state (Step S408), and performs retransmission of the lost packet.

When the transmission window size is changed, the control unit 12 does not return the transmission window size (virtual window size) to the original reception window size, and changes the transmission window size to a size slightly larger than the reception window size (the third transmission window size). In this case, the control unit 12 determines a size of reducing the transmission window size by packets-to-rollback=(sent-packets)−(original-window-size)−(rollback-margin). At this time, the control unit 12 considers that the packet which has been already transmitted over the reception window size+margin is not transmitted (see the oblique-line area in FIG. 5C).

Referring to FIG. 15, during the first recovery (Step S501), the control unit 12 determines whether or not the acknowledgement (ack) is received (step S502). When the acknowledgement (ack) is received from the reception side communication device 2 (Step S502: Yes), the control unit 12 determines whether or not the currently received selection acknowledgement (sack) is the same as the previously received selection acknowledgement (Step S503).

When the currently received selection acknowledgement (sack) is different from the previously received selection acknowledgement (Step S503: No), the control unit 12 makes the count value of the counter be zero (Step S504), and returns to Step S501. Meanwhile, when the currently received selection acknowledgement (sack) is the same as the previously received selection acknowledgement (Step S503: Yes), the control unit 12 adds 1 to the count value of the counter (Step S505).

Then, the control unit 12 determines whether or not the count value is equal to or more than 3 (Step S506). When the count value is less than 3 (Step S506: No), the control unit 12 returns to Step S501. Meanwhile, the counter value is equal to or more than 3 (Step S504: Yes), the previously reduced transmission window size (virtual window size) is further reduced and corrected (Step S507) (FIG. 5C→FIG. 5D). At this time, the control unit 12 returns the window size to the position of the selection acknowledgement (sack) repeatedly reported from the reception side communication device 2. When the packet overflows from the reception buffer of the reception side communication device 2, the selection acknowledgement constantly represents the same value, and thus this property is used. It is considered that the already transmitted packet positioned on the right side from the selection acknowledgement (sack) is not transmitted (see the oblique-line area in FIG. 5D).

When the transmission window size is corrected, the control unit 12 transfers to the second recovery state (Step S508), and performs the retransmission of the lost packet. When the recovery is completed, the control unit 12 transfers to the normal transmission state (Step S509). The control unit 12 performs the expansion transmission again (see FIG. 4 and FIG. 6). At the time of the completion of the recovery, the control unit 12 may perform a process of expanding the virtual window size at the high speed to the virtual window size of the time point when the loss of the packet. In this case, the control unit 12 stores the original virtual window size when the virtual window size is reduced, and performs a process of returning the virtual window size at the high speed to the original virtual window size. Accordingly, it is possible to improve the throughput after the completion of the recovery.

The transmission side communication device 1 can rapidly recover from the error by the process shown in FIG. 14 and FIG. 15, even when the packet transmitted over the original reception window size fits to the reception buffer.

There may be a case where the recovery frequently occurs. In such a case, even when the transmission window size is expanded and the expansion transmission is performed, retransmission of the packet becomes useless. As a condition of converting the normal transmission into the expansion transmission, the recovery may not frequently occur, except that the congestion window reaches the reception window and the reception window is stable (see FIG. 4). In this case, the transmission side communication device 1 determines a frequency of occurrence of the recovery. When the recovery frequently occurs, the conversion from the normal transmission to the expansion transmission is restricted.

The control unit 12 may variably control the virtual window size according to the frequency of occurrence of the recovery. When the frequency of recovery is high, the virtual window size decreases. When the frequency of recovery is low, the virtual window size increases.

Operation

As described above, in the embodiment, in the broad band and high delay circumstance, the transmission window size is the size (the second window size) larger than the reception window size, and the packet of the transmission amount larger than the reception window size is transmitted. Accordingly, it is possible to improve the throughput under the broad band and high delay circumstance.

In the embodiment, only the transmission side communication device 1 may be improved, but the improvement of the reception side communication device 2 is not necessary. The reception side communication device 2 may be normally mounted using a general TCP stack. In the embodiment, it is not necessary to install an additional device on the communication channel. Accordingly, it is possible to suppress a cost.

The present disclosure contains subject matter related to that disclosed in Japanese Priority Patent Application JP 2010-242137 filed in the Japan Patent Office on Oct. 28, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A communication device comprising:
a communication unit that receives a reception window size from a reception side communication device and transmits a packet of a transmission amount corresponding to a transmission window size to the reception side communication device; and
a control unit that determines whether a channel with respect to the reception side communication device is in a broad band and high delay circumstance, changes a first state where the transmission window size is a first window size which is not larger than the reception window size to a second state where the transmission window size is a second window size which is larger than the reception window size when the channel is determined to be in the broad band and high delay circumstance, and transmits the packet of the transmission amount larger than the reception window size in the second state,
wherein the communication unit receives an acknowledgement from the reception side communication device, and
wherein the control unit transmits the packet from a transmission unit at the timing when the acknowledgement is received, predicts a period when the transmission of the packet is interrupted from the reception timing of the acknowledgement in the second state, and additionally transmits the packet from the transmission unit in the period.

2. The communication device according to claim 1,
wherein the control unit disperses the packet within the period and transmits the packet from the transmission unit.

3. The communication device according to claim 1,
wherein the control unit determines whether or not the acknowledgement is intensively received within a predetermined time in the second state, and partially restricts the transmission of the packet according to the reception timing of the acknowledgement when the acknowledgement is intensively received.

4. The communication device according to claim 1,
wherein the control unit detects loss of the transmitted packet in the channel, and changes the second state where the transmission window size is the second window size to a third state where the transmission window size is a third window size smaller than the second window size when the loss of the packet is detected in the second state.

5. The communication device according to claim 4,
wherein when the second state is changed to the third state, the control unit considers that the previously already transmitted packet larger than the third window size is not transmitted.

6. The communication device according to claim 5,
wherein the third window size is larger than the reception window size.

7. The communication device according to claim 6,
wherein the communication unit receives a selection acknowledgement from the reception side communication device, and
wherein the control unit corrects the third window size on the basis of the selection acknowledgement.

8. The communication device according to claim 4,
wherein the control unit determines a frequency of changing the second state to the third state, and restricts the transmission of the packet of the transmission amount larger than the reception window size in the second state when the frequency is larger than a predetermined threshold value.

9. The communication device according to claim 8,
wherein the control unit variably controls the second window size according to the frequency of changing the second state to the third state.

10. A communication system comprising:
a reception side communication device; and
a transmission side communication device that comprises:
a communication unit that receives a reception window size from the reception side communication device and transmits a packet of a transmission amount corresponding to a transmission window size to the reception side communication device, and
a control unit that determines whether a channel with respect to the reception side communication device is in a broad band and high delay circumstance, changes a first state where the transmission window size is a first window size which is not larger than the reception window size to a second state where the transmission window size is a second window size which is larger than the reception window size when the channel is determined to be in the broad band and high delay circumstance, and transmits the packet of the transmission amount larger than the reception window size in the second state,
wherein the communication unit receives an acknowledgement from the reception side communication device, and
wherein the control unit transmits the packet from the transmission side communication device at the timing when the acknowledgement is received, predicts a period when the transmission of the packet is interrupted from the reception timing of the acknowledgement in the second state, and additionally transmits the packet from the transmission side communication device in the period.

11. A non-transitory computer readable medium having stored thereon, a computer program having at least one code section executable by a computer, thereby causing the computer to perform steps comprising:
- receiving a reception window size from a reception side communication device;
- transmitting a packet of a transmission amount corresponding to a transmission window size to the reception side communication device;
- determining whether or not a channel with respect to the reception side communication device is in a broad band and high delay circumstance;
- changing a first state where the transmission window size is a first window size which is not larger than the reception window size to a second state where the transmission window size is a second window size which is larger than the reception window size when the channel is determined to be in the broad band and high delay circumstance;
- transmitting the packet of the transmission amount larger than the reception window size in the second state;
- receiving an acknowledgement from the reception side communication device;
- transmitting the packet from a transmission side communication device at the timing when the acknowledgement is received;
- predicting a period when the transmission of the packet is interrupted from the reception timing of the acknowledgement in the second state; and
- additionally transmitting the packet from the transmission side communication device in the period.

12. A communication method comprising:
- receiving a reception window size from a reception side communication device;
- transmitting a packet of a transmission amount corresponding to a transmission window size to the reception side communication device;
- determining whether or not a channel with respect to the reception side communication device is in a broad band and high delay circumstance;
- changing a first state where the transmission window size is a first window size which is not larger than the reception window size to a second state where the transmission window size is a second window size which is larger than the reception window size when the channel is determined to be in the broad band and high delay circumstance;
- transmitting the packet of the transmission amount larger than the reception window size in the second state;
- receiving an acknowledgement from the reception side communication device;
- transmitting the packet from a transmission side communication device at the timing when the acknowledgement is received;
- predicting a period when the transmission of the packet is interrupted from the reception timing of the acknowledgement in the second state; and
- additionally transmitting the packet from the transmission unit in the period.

* * * * *